(No Model.)

7 Sheets—Sheet 1.

W. F. DURFEE.
MACHINE FOR BEVELING AND TRIMMING HORSESHOE NAIL BLANKS.

No. 266,585. Patented Oct. 24, 1882.

WITNESSES

INVENTOR (No Model.)

W. F. DURFEE.

MACHINE FOR BEVELING AND TRIMMING HORSESHOE NAIL BLANKS.

No. 266,585. Patented Oct. 24, 1882.

WITNESSES—

INVENTOR—

(No Model.)   7 Sheets—Sheet 7.

W. F. DURFEE.
MACHINE FOR BEVELING AND TRIMMING HORSESHOE NAIL BLANKS.

No. 266,585.   Patented Oct. 24, 1882.

WITNESSES.
Isaac Holden
George Terry

INVENTOR.
William F. Durfee

UNITED STATES PATENT OFFICE.

WILLIAM F. DURFEE, OF BRIDGEPORT, CONNECTICUT, ASSIGNOR TO THE WHEELER & WILSON MANUFACTURING COMPANY, OF SAME PLACE.

MACHINE FOR BEVELING AND TRIMMING HORSESHOE-NAIL BLANKS.

SPECIFICATION forming part of Letters Patent No. 266,585, dated October 24, 1882.

Application filed March 30, 1882. (No model.)

*To all whom it may concern:*

Be it known that I, WILLIAM F. DURFEE, a citizen of the United States, residing at Bridgeport, in the county of Fairfield and State of Connecticut, have invented certain new and useful Improvements in Machines for Beveling Horseshoe-Nail Blanks and Trimming the Same to a Uniform Length, of which the following is a specification.

For the purpose of showing the practical application of my invention, I have illustrated the same in the form of a machine for performing the beveling and trimming operations on double-ended blanks to be used in the manufacture of horseshoe-nails.

Similar letters of reference indicate like parts in the accompanying drawings, in which—

Figure 1:
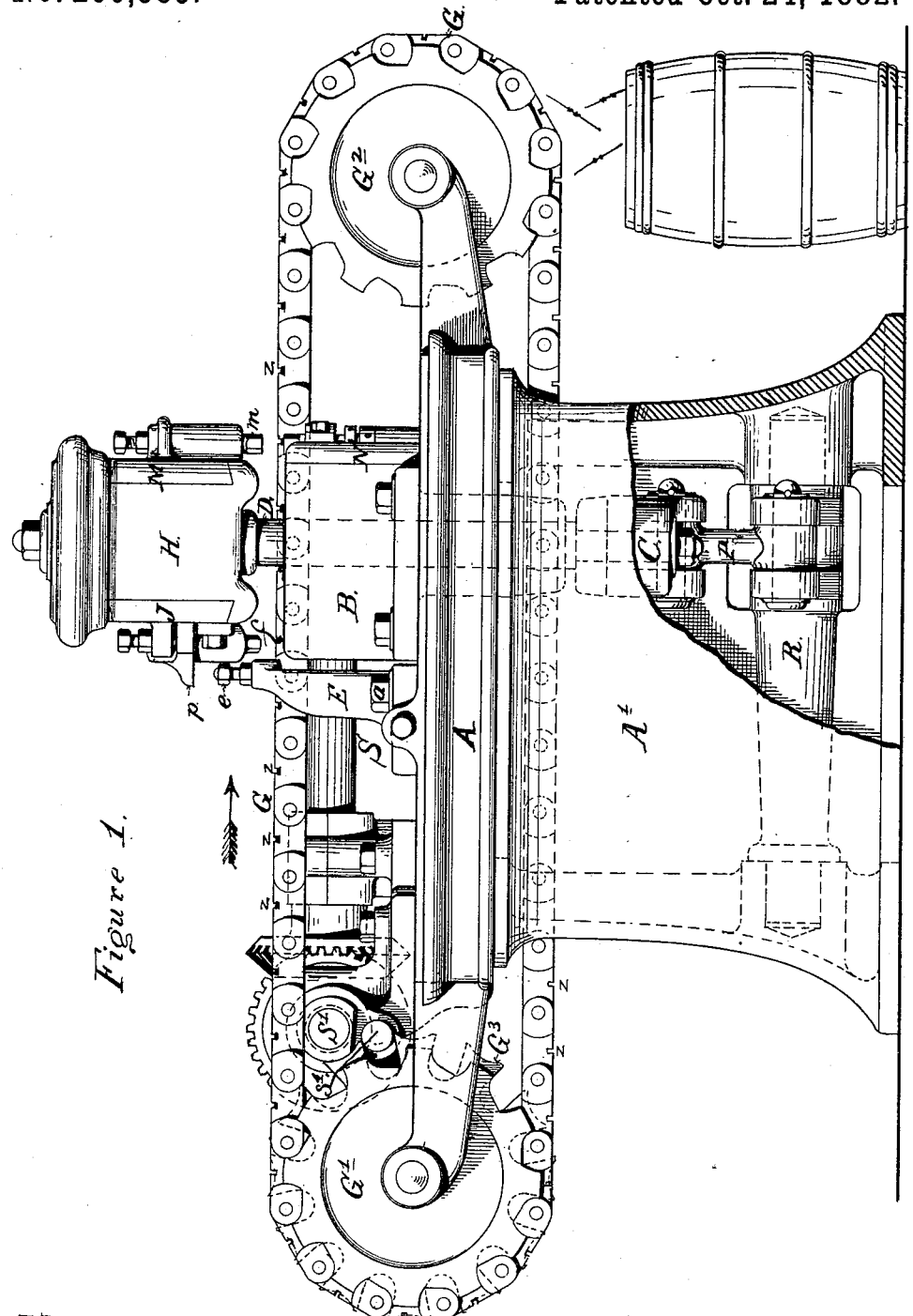
Figure 2:
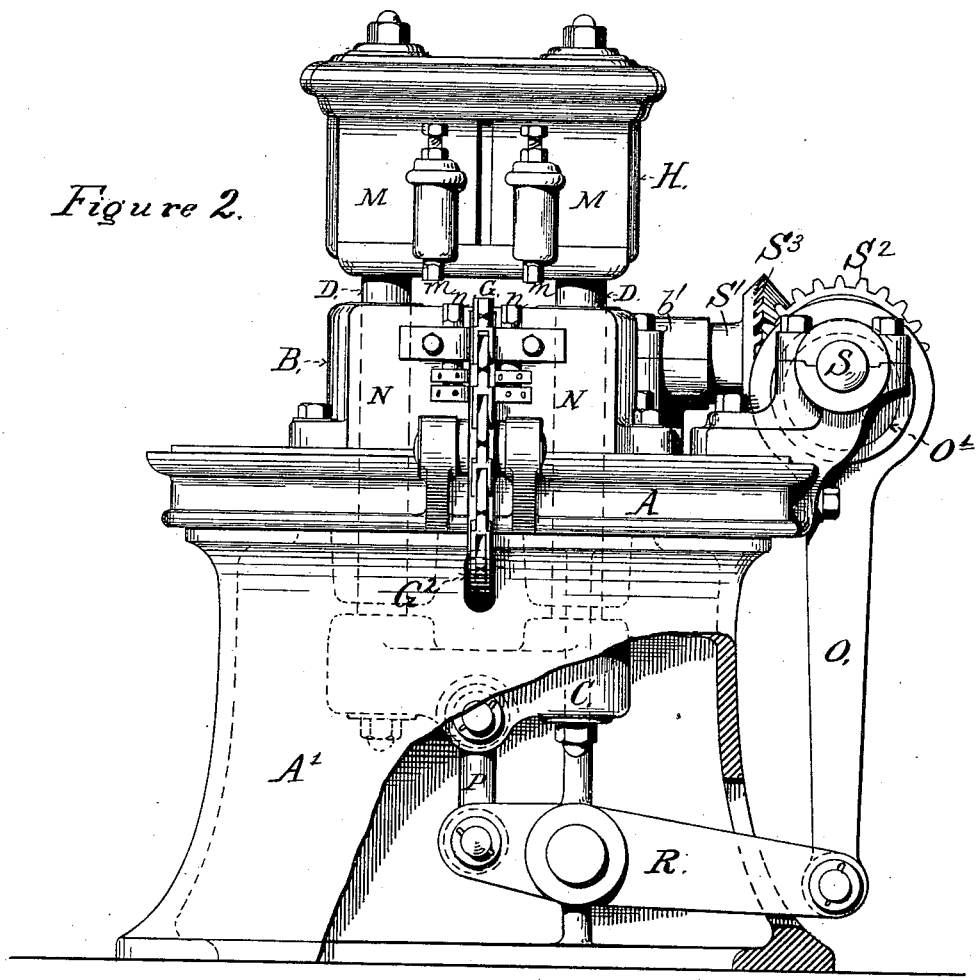
Figure 3:
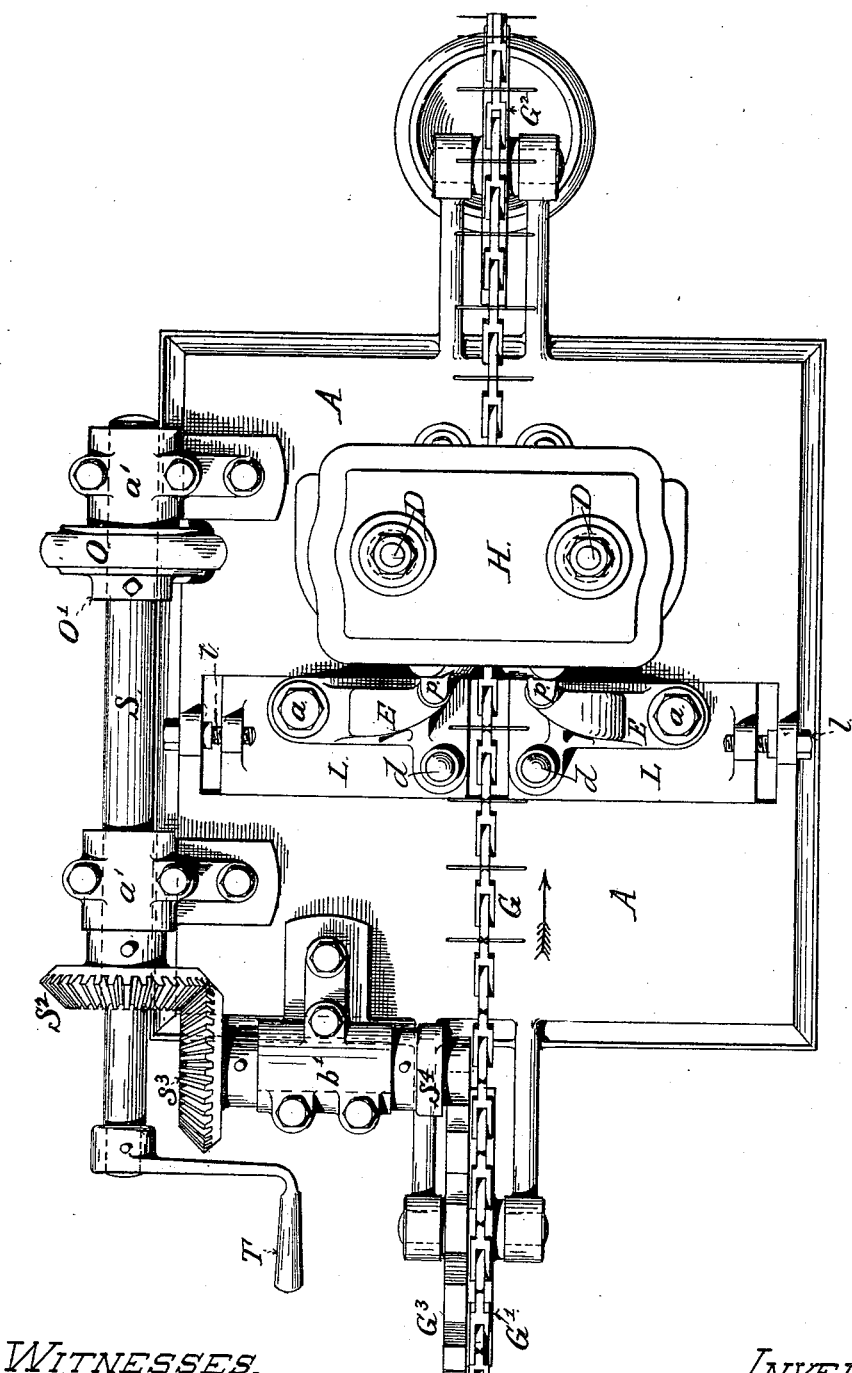
Figure 4:
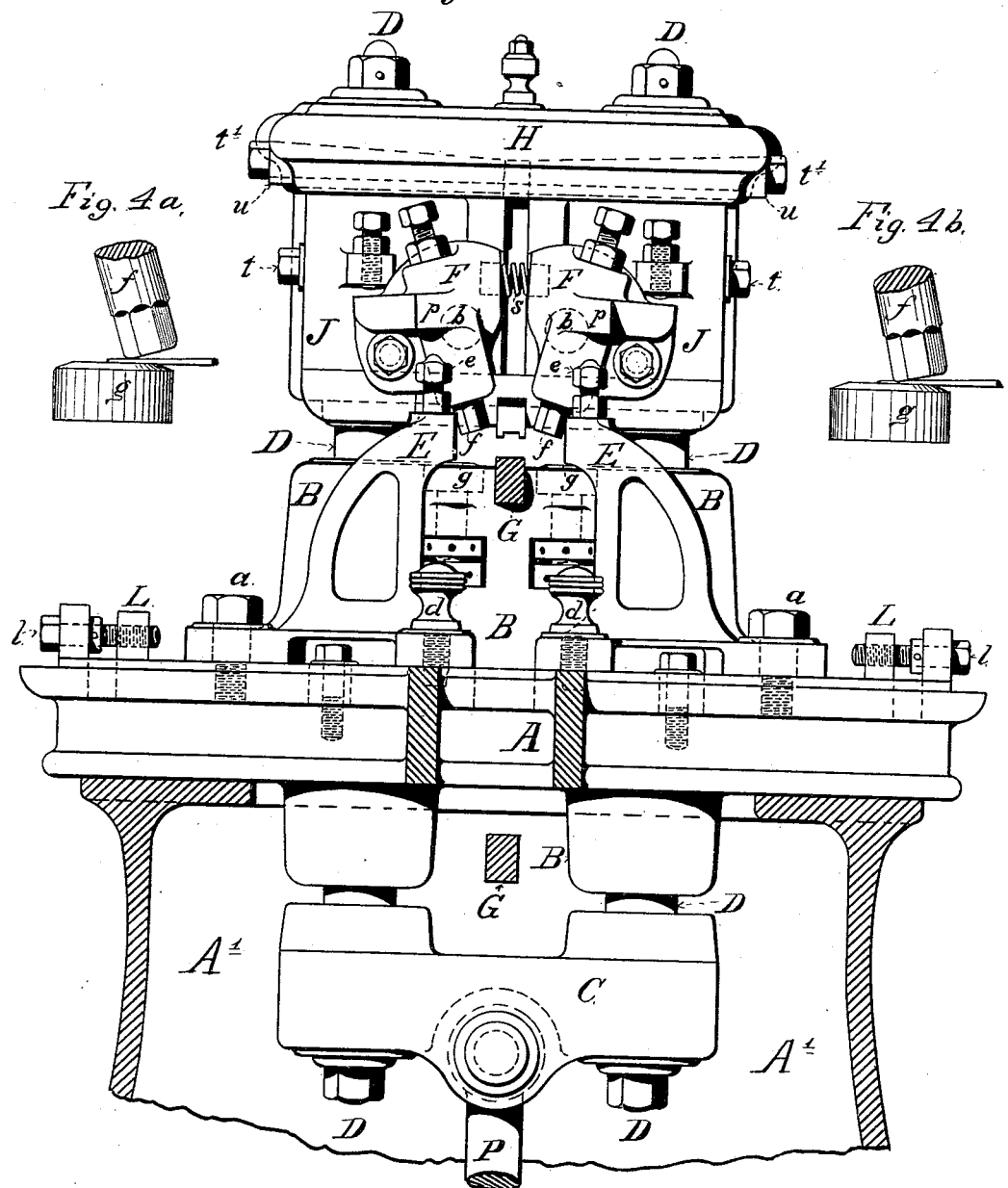
Figure 5:
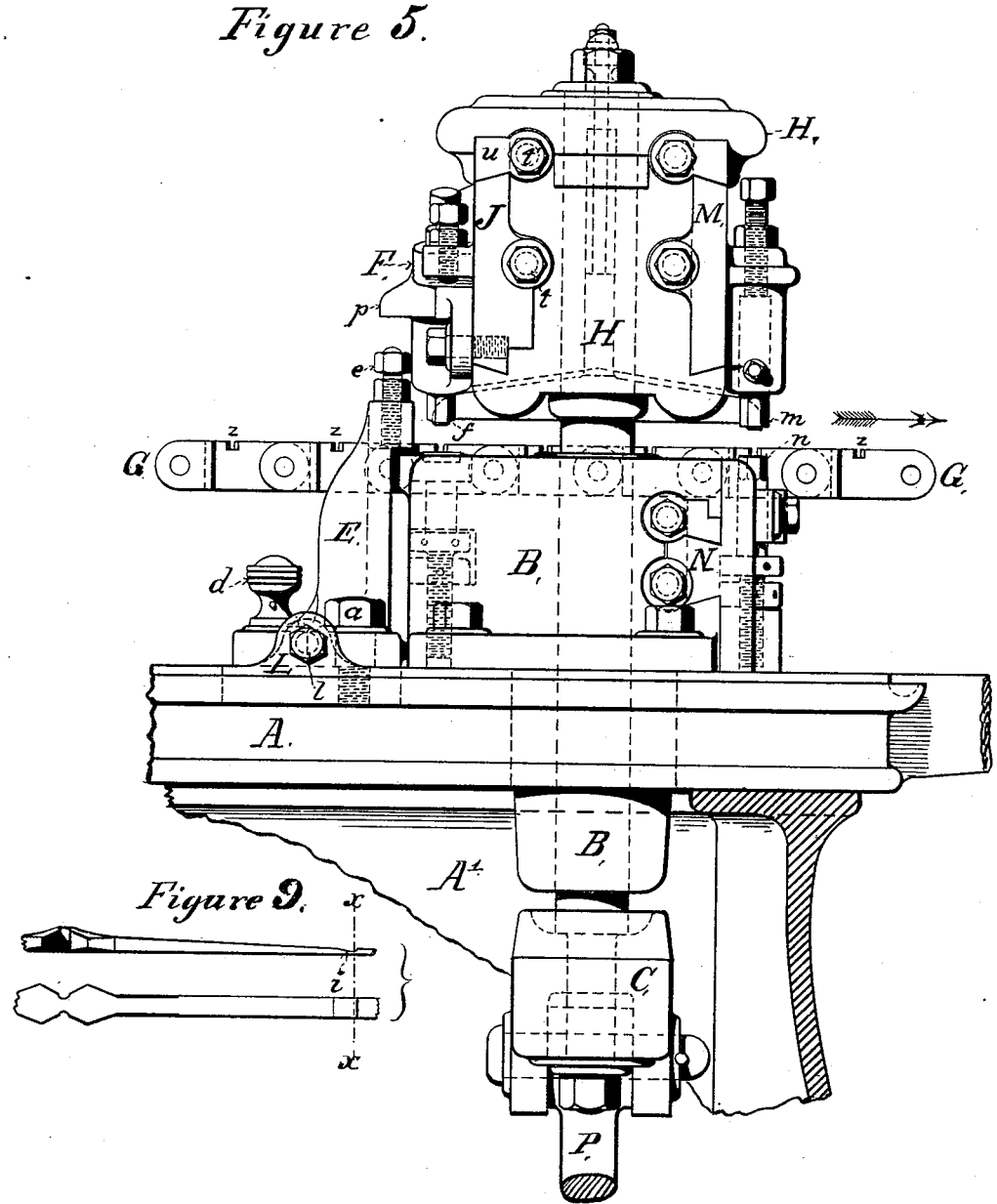
Figure 6:
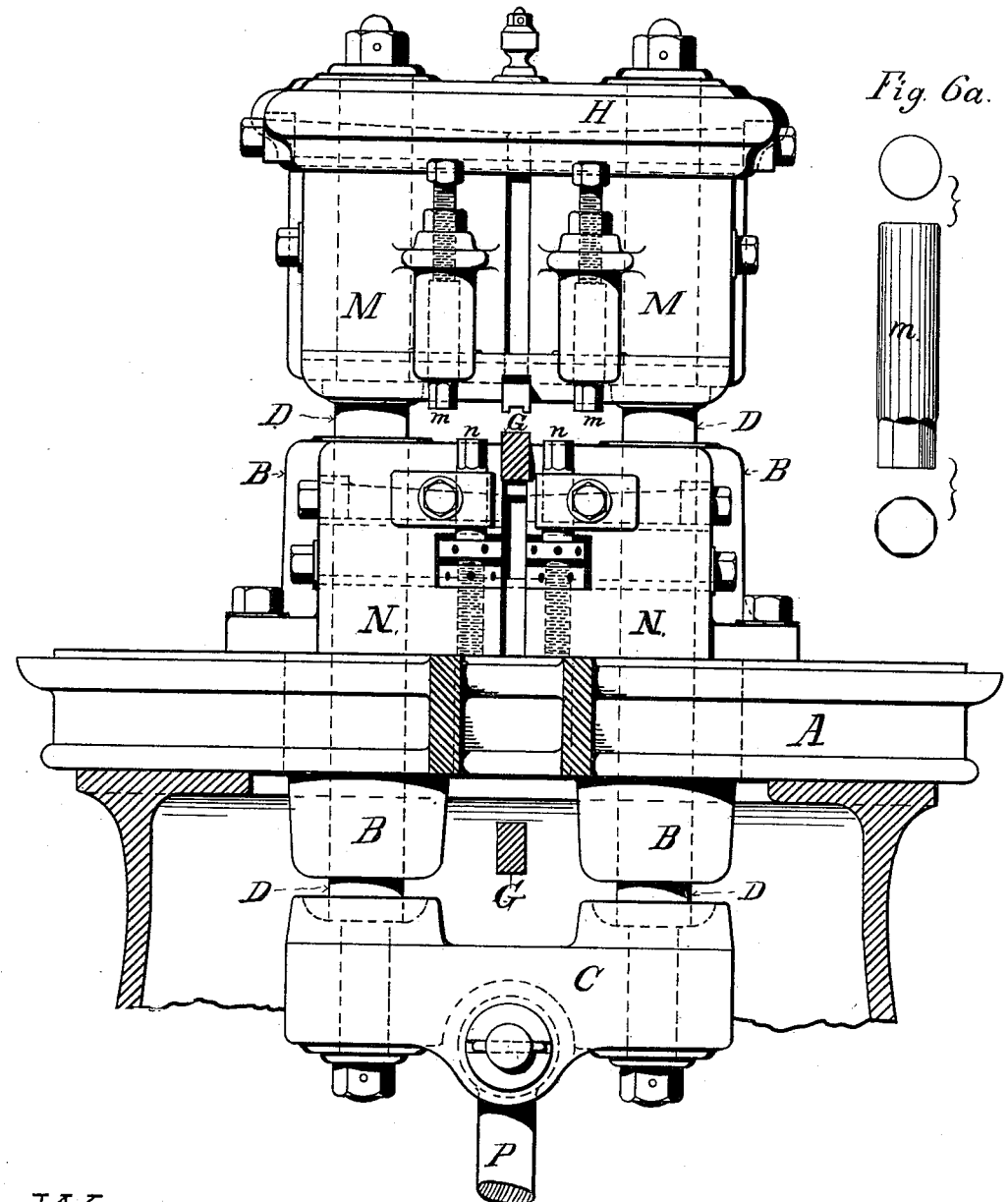
Figure 7:
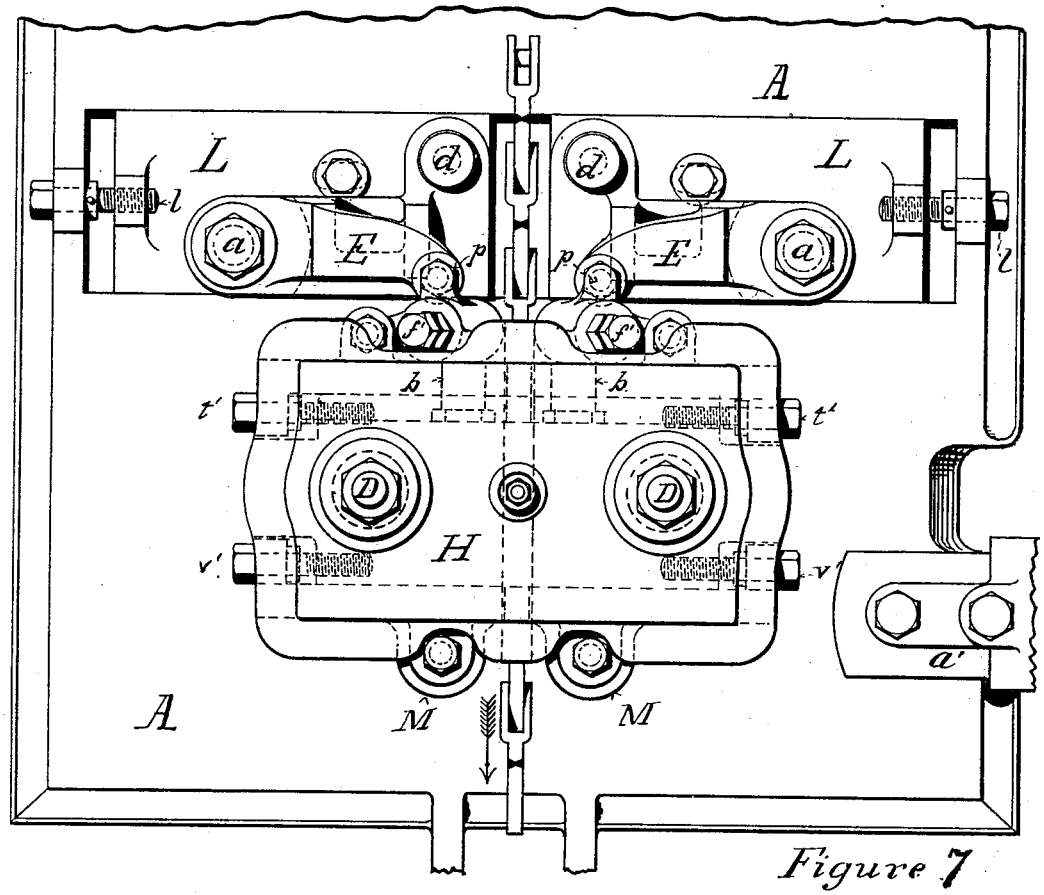
Figure 8:
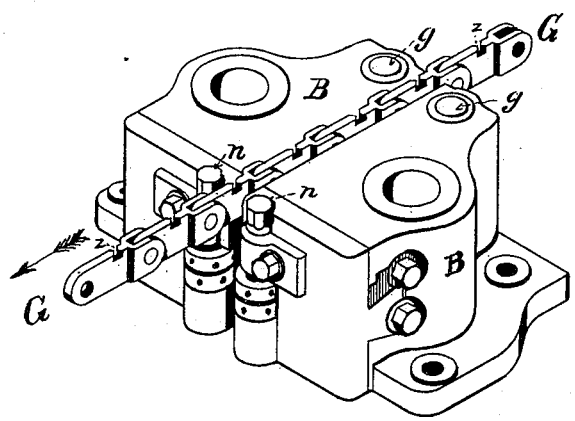

Figure 1 is a side elevation of the complete machine, the lower right-hand corner of the frame being removed to show more clearly a part of the operating mechanism. Fig. 2 is an end elevation of the preceding figure, and is also drawn with a corner of the frame broken away for the purpose of showing the links and lever operating the press-head. Fig. 3 is a plan view of the machine, and illustrates the manner of driving the various parts. Fig. 4 is an enlarged front elevation of the mechanism, (part of the frame-work being removed,) showing the beveling device. Figs. 4$^a$ and 4$^b$ are two enlarged diagrams of the beveling-dies, the first showing their relations at the instant the lower corner of the moving die touches the blank, the second showing the same parts at the instant the moving die has reached its lowest position. Fig. 5 is a side elevation of Fig. 4, a fragment of the conveying-chain being shown. Fig. 6 is an elevation of that side of the mechanism which is opposite the one illustrated in Fig. 4, and shows the trimming devices; and Fig 6$^a$ represents in three views one of the trimming-dies, $m$. Fig. 7 represents a plan view of the beveling and trimming mechanism with a portion of the base-plate. Fig. 8 shows the base-block and part of the conveying-chain in perspective. Fig. 9 represents in two enlarged views one-half of a blank, and shows the result of the operations performed thereon by the mechanisms illustrated.

In the several figures, A' represents a frame for supporting the base-plate A and its attachments.

B is the base-block, secured to the base-plate A, and through it passes the two vertical and parallel guide-bars D D, which bars are connected at their lower extremities by the yoke C and at their upper extremities to the press-head H.

S (see Figs. 1, 2, and 3) is the driving-shaft, which rotates, by means of power applied at T, in the bearings $a'$ $a'$, attached to the base-plate A, and its motion is communicated through the miter-gears S$^2$ and S$^3$ to the short chain-driving shaft S', which revolves in the bearing $b'$, also attached to the base-plate A. The shaft S carries with it the eccentric O', (see Figs. 2 and 3,) which, through the rocking lever R and links O and P, communicates a vertical reciprocating movement to the yoke C and press-head H.

G, Fig. 1, is an endless conveying-chain, composed of a series of similar links, each having in its upper surface a notch or depression, $z$, for the reception of the blanks on which the beveling and trimming devices are to operate, said chain being carried on and by the two chain-wheels G' and G$^2$, (see Figs. 1, 2, and 3,) and is guided and supported in a groove formed in the upper side of the base-block B. (See Fig. 8.)

The operation of this combined mechanism is substantially as follows, to wit: The double-ended blanks to be operated upon are inserted in the notches $z$ of the conveying-chain G, either by hand or automatically, and said chain is caused to move intermittingly in the direction of the arrow through the space of one link at each revolution of the driving-shaft S by the intervention of the short shaft S', carrying at its end the crank S$^4$, which, in the course of its revolutions, engages successively with the radial slots formed in the circumference of the "star-wheel" G$^3$, attached to the chain-wheel G'. (See Figs. 1 and 3.) After the blanks are inserted in the chain-links, as described, they are carried along by said chain until the extremities of one of the blanks rest in position on the lower dies, $g\ g$, of the beveling device, (which are capable of vertical adjustment,) when the press-head H, carrying the upper beveling-dies, $ff$, is made to descend, as described, until the lower corners of said dies come in contact with the blank near its extremities, (see diagram, Fig. 4ª,) at which instant the projecting lugs $p\,p$ of the upper-die holders F F rest on the rounded heads of the stationary pressure-bolts $e\,e$ carried by the standards E E, (see Figs. 4, 5, and 7,) and as the press-head H continues its downward movement the contact of the lugs $p\,p$ aforesaid with said pressure-bolts causes the swinging plates F F, carrying the dies $ff$, to move about their axes $b\,b$, (see Figs. 4 and 7,) which are carried in the adjustable plates J J, thus producing a simultaneous pressing and drawing action upon the blank, (see diagram, Fig. 4ᵇ,) resulting in giving to its extremities the form shown at $i$ in Fig. 9. During the following upward movement of the press-head H aforesaid the swinging die-holding plates F F and their appurtenances are caused to return (by means of the spring $s$) to the position which they occupied before the said press-head commenced its downward movement.

For the purpose of adapting these devices to different lengths of blanks, the plates J J, hereinbefore mentioned, are made to adjust horizontally at right angles to the chain by means of the screws $t\,t$, and are clamped in position, when adjusted, by the wedges $u\,u$, the same being operated by the screws $t'\,t'$. For a like purpose the pressure-bolt standards E E, attached to the plates L L, are made adjustable horizontally to or from the chain G and at right angles thereto by the screws $l\,l$, acting on said plates; and, further, for the purpose of making the lower dies, $g\,g$, more accessible, said standards are made to swing about the vertical studs $a\,a$ after the withdrawal of the hand-screws $d\,d$. The upper dies, $ff$, are cylindrical in form, (their lower extremities being polygonal in form,) and admit of a rotation for the purpose of bringing a new corner to bear upon the work (see diagram, Fig. 4ª) when the corner in use has become misshapen. After having been operated upon at their extremities, as hereinbefore described, the blanks are, by a succession of movements of the chain, brought into position over the lower dies, $n\,n$, of the trimming devices, (which dies are located on the opposite side of the base-block B to that occupied by the lower dies of the beveling device before described,) so that when the press-head H is moved downward the upper trimming-dies, $m\,m$, carried thereon will act, with the lower stationary dies, $n\,n$, to trim off the surplus metal at the points of the blanks, as on the line $x\,x$, Fig. 9.

For the purpose of adapting this device to different lengths of blanks, the plates M M and N N, carrying the upper and lower dies, are provided with adjustments substantially the same as those already described in connection with the upper die-holder of the beveling device.

For the purpose of facilitating the renewal of the cutting-edges of the trimming-dies they are made cylindrical, with their cutting ends of polygonal cross-section, (see Fig. 6ª,) so that by turning them in their respective holders a sharp cutting-edge may be substituted for a dulled one. Said dies are also provided with a vertical adjustment whereby to compensate for the amount of metal removed from their polygonal ends when they are resharpened.

Having thus described my improvements, what I claim as new, and desire to secure by Letters Patent, is—

1. A beveling mechanism composed of the vertically-adjustable lower dies, $g\,g$, the swinging die-holders F F, having lugs $p\,p$, the upper dies, $ff$, carried by said holders, the pressure-bolts $e\,e$, and suitable supporting and operating devices, all combined and arranged substantially as set forth, whereby a combined pressing and drawing motion is imparted to the beveling-dies, substantially as and for the purpose described.

2. The combination, with the base-plate A, block B, vertically-movable press-head H, and the notched conveying-chain G, of the horizontally-adjustable plates L L and J J, swinging standards E E, having pressure-bolts $e\,e$, vertically-adjustable lower dies, $g\,g$, and the swinging die-holders F F, having lugs $p\,p$ and upper dies, $f\,f$, substantially as and for the purpose described.

3. The combination of an intermittingly-moving chain having notches adapted to receive double horseshoe-nail blanks, the head H, upper beveling and trimming dies carried thereby, and the base-block B, provided with lower beveling and trimming dies, substantially as described.

4. The combination, with an intermittingly-moving chain having notches adapted to carry double horseshoe-nail blanks, of the head H, trimming-dies $m\,m$ carried thereby, and having their ends polygonal in cross-section, and the base-block B, provided with lower similarly-shaped dies, $n\,n$, substantially as described.

5. The combination, with an intermittingly-moving chain provided with notches adapted to receive and carry double horseshoe-nail blanks, of upper and lower beveling and trimming dies, means for adjusting said dies to varying lengths of blanks, and suitable operating mechanism, substantially as described.

In testimony whereof I affix my signature in presence of two witnesses.

WILLIAM F. DURFEE.

Witnesses:
 ISAAC HOLDEN,
 GEORGE TERRY.